(12) United States Patent
Zhang et al.

(10) Patent No.: US 10,696,574 B2
(45) Date of Patent: Jun. 30, 2020

(54) METHOD FOR TREATING REVERSE OSMOSIS CONCENTRATED WATER

(71) Applicant: Wanhua Chemical Group Co., Ltd., Yantai, Shandong (CN)

(72) Inventors: Hongke Zhang, Shandong (CN); Zhenlong Fan, Shandong (CN); Junjun Wang, Shandong (CN); Xiaogao Liu, Shandong (CN); Meirong Duan, Shandong (CN); Bo Zhou, Shandong (CN); Rui Wang, Shandong (CN); Hua Heng, Shandong (CN); Weiqi Hua, Shandong (CN)

(73) Assignee: Wanhua Chemical Group Co., Ltd. (CN)

( * ) Notice: Subject to any disclaimer, the term of this patent is extended or adjusted under 35 U.S.C. 154(b) by 0 days.

(21) Appl. No.: 16/327,641

(22) PCT Filed: Aug. 31, 2016

(86) PCT No.: PCT/CN2016/097631
§ 371 (c)(1),
(2) Date: Feb. 22, 2019

(87) PCT Pub. No.: WO2018/035883
PCT Pub. Date: Mar. 1, 2018

(65) Prior Publication Data
US 2019/0202724 A1    Jul. 4, 2019

(30) Foreign Application Priority Data
Aug. 25, 2016    (CN) .......................... 2016 1 0719214

(51) Int. Cl.
| | | |
|---|---|---|
| *C02F 9/00* | (2006.01) | |
| *B01J 21/04* | (2006.01) | |
| *B01J 35/08* | (2006.01) | |
| *B01J 37/02* | (2006.01) | |
| *B01J 23/00* | (2006.01) | |
| *B01J 37/08* | (2006.01) | |
| *B01J 23/889* | (2006.01) | |
| *B01J 35/00* | (2006.01) | |
(Continued)

(52) U.S. Cl.
CPC ................. *C02F 9/00* (2013.01); *B01J 21/04* (2013.01); *B01J 23/002* (2013.01); *B01J 23/8892* (2013.01); *B01J 35/0026* (2013.01); *B01J 35/023* (2013.01); *B01J 35/08* (2013.01); *B01J 35/1019* (2013.01); *B01J 35/1047* (2013.01); *B01J 35/1066* (2013.01); *B01J 37/0201* (2013.01); *B01J 37/0207* (2013.01); *B01J 37/0213* (2013.01); *B01J 37/0236* (2013.01); *B01J 37/088* (2013.01); *B01J 2523/00* (2013.01); *C02F 1/283* (2013.01); *C02F 1/441* (2013.01); *C02F 1/5236* (2013.01); *C02F 1/66* (2013.01); *C02F 1/722* (2013.01); *C02F 1/725* (2013.01); *C02F 1/76* (2013.01); *C02F 2301/08* (2013.01)

(58) Field of Classification Search
CPC ........ B01D 37/00; B01D 37/03; B01D 61/00; B01D 61/02; B01D 61/022; B01D 61/025; B01D 61/04; B01D 61/12; B01D 61/58; B01J 21/00; B01J 21/02; B01J 21/04; B01J 35/00; B01J 35/0026; B01J 35/023; B01J 35/08; B01J 35/1019; B01J 35/1047; B01J 35/1066; B01J 32/00
USPC ....... 210/638, 633, 634, 639, 644, 649, 650, 210/651, 652, 660, 663, 681, 702, 710, 210/712, 721, 722, 723, 724, 726, 749, 210/757, 758, 763, 765, 767, 806
See application file for complete search history.

(56) References Cited

U.S. PATENT DOCUMENTS

| | | | | |
|---|---|---|---|---|
| 6,322,701 B1 * | 11/2001 | Delighiannis | ........... | C02F 1/705 210/620 |
| 2014/0069821 A1 * | 3/2014 | Marcin | ................... | C25B 15/00 205/498 |

FOREIGN PATENT DOCUMENTS

| | | |
|---|---|---|
| CN | 101723485 A | 6/2010 |
| CN | 101993162 A | 3/2011 |
(Continued)

OTHER PUBLICATIONS

International Search Report PCT/CN2016/097631 dated May 3, 2017.
(Continued)

*Primary Examiner* — Allison G Fitzsimmons
(74) *Attorney, Agent, or Firm* — Lerner, David, Littenberg, Krumholz & Mentlik, LLP

(57) ABSTRACT

A method for treating reverse osmosis concentrated water, comprises adding precipitant and oxidant to reverse osmosis concentrated water for treatment, filtering to obtain clear liquid, and adding catalyst for water treatment to clear liquid for catalytic oxidation to obtain a first-stage treated water. Optionally, the liquid may be subjected after catalytic oxidation to an adsorption treatment; performing reverse osmosis treatment on first-stage treated water to obtain second-stage reverse osmosis product water and second-stage reverse osmosis concentrated water; and adding oxidant to second-stage reverse osmosis concentrated water for oxidation treatment to obtain directly discharged effluent water. The obtaining of effluent water may further comprise subjecting liquid after oxidation treatment to adsorption treatment. The above method can recycle 75-85 wt % of water, and operates easily. Thereby, improvement to overall utilization rate of water, and treatment of little remaining water is met to effluent standard for reduction of environmental pollution and economic investment.

20 Claims, No Drawings

(51) Int. Cl.
    *B01J 35/02*     (2006.01)
    *B01J 35/10*     (2006.01)
    *C02F 1/72*     (2006.01)
    *C02F 1/28*     (2006.01)
    *C02F 1/44*     (2006.01)
    *C02F 1/52*     (2006.01)
    *C02F 1/66*     (2006.01)
    *C02F 1/76*     (2006.01)

(56) References Cited

FOREIGN PATENT DOCUMENTS

| | | |
|---|---|---|
| CN | 102040294 A | 5/2011 |
| CN | 102153171 A | 8/2011 |
| CN | 202139130 U | 2/2012 |
| CN | 102372376 A | 3/2012 |
| CN | 102603128 A | 7/2012 |
| CN | 102633410 A | 8/2012 |
| CN | 102849879 A | 1/2013 |
| CN | 103449635 A | 12/2013 |
| CN | 103723799 A | 4/2014 |
| CN | 104445788 A | 3/2015 |
| CN | 104549316 A | 4/2015 |
| CN | 104609610 A | 5/2015 |
| CN | 105585180 A | 5/2016 |
| CN | 105731629 A | 7/2016 |
| EP | 0723938 A2 | 7/1996 |
| HU | 227326 B1 | 3/2011 |
| JP | 200125777 A | 1/2001 |

OTHER PUBLICATIONS

Search Report from Chinese Office Action for CN201610719214.3 dated Oct. 8, 2018; 2 pages.
Search Report from Hungarian Application No. P1900093/13 dated Dec. 5, 2019; 1 page.

* cited by examiner

METHOD FOR TREATING REVERSE OSMOSIS CONCENTRATED WATER

CROSS REFERENCE TO RELATED APPLICATIONS

The present application is a national phase entry under 35 U.S.C. § 371 of International Application No. PCT/CN2016/097631, filed Aug. 31, 2016, which claims priority from Chinese Patent Application No. 201610719214.3 filed Aug. 25, 2016, all of which are hereby incorporated herein by reference.

TECHNICAL FIELD

The present invention relates to the technical field of waste water treatment of environmental engineering, more specifically a treating method of reverse osmosis concentrated water.

TECHNICAL BACKGROUND

In recent years, with the rapid development of the petrochemical industry, water resource shortage has become a principle factor restricting China's economic and social development. Therefore, the water resource utilization has drawn more and more attention. Reverse osmosis not only can effectively remove inorganic salt ions in water, but also can remove colloids, bacteria, viruses, bacterial endotoxin and most of impurities such as organics and the like in water. Moreover, reverse osmosis has high system stability and low operating cost. Therefore, reverse osmosis becomes a main technical means for recycle of reclaimed water. However, after the reverse osmosis treatment, in addition to the water that can be reused, reverse osmosis concentrated water which is concentrated for 3-5 times (relative to the reclaimed water before the reverse osmosis) can be produced. The obtained reverse osmosis concentrated water has the following defects: higher dissolved organics content, high solution chromaticity, high salt content, and poor biodegradability.

The conventional treating methods of reverse osmosis concentrated water containing high COD use ozone, hydrogen peroxide and the like as an oxidant. It is oxidized under the action of catalyst, ultrasound and the like to degrade organics so as to meet the emission standards. CN 102040294 A discloses a method for treating reverse osmosis concentrated water by ozone and hydrogen peroxide as an oxidant with activated carbon adsorption, its oxidant dosage is large, and the running cost is relatively higher. CN 102153171 A discloses a method for treating reverse osmosis concentrated water by ozone catalytic oxidation, which causes secondary pollution due to aeration during the process, in which the offgas needs to be treated. CN 102633410 A discloses a method for treating reverse osmosis concentrated water by photocatalytic oxidation combined with biochemistry. Since the process thereof contains biochemistry, it is only suitable for reverse osmosis concentrated water with a lower salt content, and the effect of photocatalytic oxidation and biochemically reducing COD is poor, and it is not suitable for reverse osmosis concentrated water with higher COD. CN 103449635 A discloses a method of treating reverse osmosis concentrated water by Fenton oxidation process. The defects of the method lie in that Fenton oxidation process needs to be conducted under an acidic condition, pH needs to be adjusted in the process, a large amount of precipitation is produced in the process, and the treatment cost is high.

CN 102849879 A discloses a method for recovering part of water by electrodialysis after pre-treatment of reverse osmosis concentrated water, but no specific solution is provided for how to treat concentrated water produced by electrodialysis. CN 103723799 A and CN 104445788 A disclose that the reverse osmosis concentrated water is further processed by a combined process of ultrafiltration and reverse osmosis, and part of the water is recovered, the produced concentrated water is deeply concentrated by electrodialysis, and the fresh water produced in the concentration process is reused, the concentrated water is evaporated and crystallized. CN 104609610 A discloses that a reverse osmosis apparatus is used to recover part amount of water. The concentrated water is further concentrated by forward osmosis. The water produced by forward osmosis is reused, and the remaining trace amount of concentrated water is fed into an evaporation apparatus for treatment, and the purpose of zero discharge is finally achieved. The advantages of the above schemes lie in that reverse osmosis concentrated water is further recycled after treatment, so that the overall utilization rate of water is improved. However, no matter which one of the reverse osmosis, electrodialysis, and forward osmosis and the like is used, concentrated water with an extremely high salt concentration (salt content is 15-18 wt %) is produced, and further treatment by evaporation and crystallization is required. Due to the high salt content, the crystallizer is basically made of titanium, which requires high investments and operation costs. Multi-effect evaporation and mechanical vapor recompression (MVR) are two common evaporation crystallization techniques. Calculated on high-salt wastewater of 10 t/h, the multi-effect evaporation technology needs an investment of CNY 3 to 5 million and an operating cost of CNY 60-70 per ton; the MVR technology needs an investment of CNY 8-12 million and an operation cost of CNY 35-45 per ton. In view of the above, the bottleneck for widespread use of a near zero emission process for reverse osmosis concentrated water lies in the treatment of the high salt concentrated water which is obtained after desalination treatment and difficult to be treated. Therefore, it is necessary to develop a highly efficient and economical near zero emission process of reverse osmosis concentrated water.

SUMMARY OF THE INVENTION

The object of the present invention is to provide a treating method of reverse osmosis concentrated water, which is simple and easy to operate, has low investment and operation cost, can effectively recycle waste water to achieve near-zero discharge of waste water, and is environmentally friendly.

The technical solutions of the present invention are as follows:

A treating method of reverse osmosis concentrated water, comprising the following steps:

(1) adding a precipitant and an oxidant to reverse osmosis concentrated water for treatment, filtering to obtain a clear liquid, and adding a catalyst for water treatment to the clear liquid for catalytic oxidation to obtain first-stage treated water; wherein the obtaining of the first-stage treated water optionally further comprises subjecting the liquid after catalytic oxidation to an adsorption treatment;

(2) conducting reverse osmosis treatment to the first-stage treated water obtained in step (1), to obtain second-stage reverse osmosis product water and second-stage reverse osmosis concentrated water, wherein the second-stage reverse osmosis product water is used for recycling;

(3) adding an oxidant to second-stage reverse osmosis concentrated water obtained in step (2) for oxidation treatment to obtain effluent water, which is used for directly discharging; the obtaining of the effluent water optionally further comprises subjecting the liquid after oxidation treatment to an adsorption treatment.

In step (1), the reverse osmosis concentrated water preferably fulfills the following conditions: the COD is less than or equal to 300 ppm, preferably 50-300 ppm, more preferably 50-250 ppm; the $Ca^{2+}$ content in the reverse osmosis concentrated water is 0-1000 ppm, preferably is 50-500 ppm; the $Mg^{2+}$ content is 0-500 ppm, preferably is 50-200 ppm; the $SiO_2$ content is 0-200 ppm, preferably is 10-150 ppm.

In step (1), the reverse osmosis concentrated water further preferably fulfills the following conditions: the COD is 50-300 ppm, preferably 50-250 ppm; pH is 6-9, preferably 7-8; the TDS is 1000-20000 ppm, preferably is 2000-10000 ppm; the cation comprises one or more of $Na^+$, $K^+$, $Ca^{2+}$, and $Mg^{2+}$, and the anion comprises one or more of $Cl^-$, $SO_4^{2-}$, $NO_3^-$ and the like; wherein the $Ca^{2+}$ content is 0-1000 ppm, preferably is 50-500 ppm, the $Mg^{2+}$ content is 0-500 ppm, preferably is 50-200 ppm; the $SiO_2$ content is 0-200 ppm, preferably is 10-150 ppm, the $NH_4^+$ content is 0-50 ppm, preferably 0-10 ppm, the heavy metal elements content is 0-5 ppm, preferably is 0-0.5 ppm, and the suspended matter content is 0-1000 ppm, preferably is 0-200 ppm. Preferably, in step (1), pH of the reverse osmosis concentrated water is firstly adjusted to be 6-12, preferably 9-11, then the precipitant and oxidant are added therein for treatment. Since the initial pH of the reverse osmosis concentrated water is 6-9, the pH regulator used herein for adjusting the pH is an alkaline pH regulator, and the alkaline pH regulator is selected from the group consisting of NaOH, KOH, $Ca(OH)_2$, $Mg(OH)_2$, ammonia water and the like, and any combination thereof, preferably NaOH and/or KOH.

"Optionally" means including or not including.

In step (1), "the obtaining of the first-stage treated water optionally further comprises subjecting the liquid after catalytic oxidation to an adsorption treatment" means that before obtaining the first-stage treated water, the liquid after catalytic oxidation can be optionally subjected to an adsorption treatment depending on circumstances. If COD≤50 ppm in the liquid after catalytic oxidation, then there is no need to perform the adsorption treatment, and the first-stage treated water is directly obtained; if COD>50 ppm in the liquid after catalytic oxidation, then there is a need to perform the adsorption treatment on the liquid, then the first-stage treated water is obtained.

In step (3), "the obtaining of the effluent water optionally further comprises subjecting the liquid after oxidation treatment to an adsorption treatment" means that before the effluent water is obtained, the liquid after oxidation treatment can be optionally subjected to an adsorption treatment depending on circumstances. If COD≤50 ppm in the liquid after oxidation treatment, then there is no need to perform the adsorption treatment, and the effluent water is directly obtained; if COD>50 ppm in the liquid after oxidation treatment, then there is a need to perform the adsorption treatment on the liquid, then the effluent water is obtained.

Preferably, in step (1), before the catalyst is added to the clear liquid, the pH of the clear liquid is firstly adjusted to 6-9, preferably 7-8.

More preferably, in step (1), firstly the pH of the clear liquid is adjusted to 6-9, preferably 7-8, then the clear liquid after pH adjustment is filtered with a filtering apparatus, and the catalyst is added to the obtained filtrate for catalytic oxidation.

Preferably, in step (1), the precipitant is selected from the group consisting of NaOH, KOH, $Na_2CO_3$, $NaHCO_3$, and any combination thereof, preferably $Na_2CO_3$ and/or $NaHCO_3$. The precipitant and hardness ions such as $Ca^{2+}$ and $Mg^{2+}$ in the reverse osmosis concentrated water are reacted to form precipitate so as to reduce the hardness of the reverse osmosis concentrated water, meanwhile, $Mg^{2+}$ will reduce $SiO_2$ in the reverse osmosis concentrated water in the precipitation process (the magnesium ions react with metasilicate or silicate to form magnesium silicate, and the magnesium silicate has a low solubility and most of the magnesium silicate forms precipitate), thereby achieving the purpose of simultaneous removal of $SiO_2$. The dosage of the precipitant is determined based on the initial contents of $Ca^{2+}$, $Mg^{2+}$ and $SiO_2$ in the reverse osmosis concentrated water. The initial contents of $Ca^{2+}$, $Mg^{2+}$ and $SiO_2$ in the reverse osmosis concentrated water are obtained by analyzing the water sample of the reverse osmosis concentrated water.

Preferably, in step (1), the oxidant is selected from the group consisting of a compound containing available chlorine, $H_2O_2$, and combination thereof, and the compound containing available chlorine comprises NaClO, $NaClO_3$, $Cl_2$ and $ClO_2$; the oxidant preferably is NaClO and/or $H_2O_2$. Part of easily oxidizable organics in the reverse osmosis concentrated water are degraded into $CO_2$ and water by oxidant in a redox reaction, so as to reduce COD of the reverse osmosis concentrated water. The dosage of oxidant is determined based on the initial COD of the reverse osmosis concentrated water, and the molar ratio of the oxidant to the COD of the reverse osmosis concentrated water (calculated by $O_2$) is 0.5-2.5:1, preferably is 0.5-1.2:1, more preferably 0.5-1:1. The initial value of COD in the reverse osmosis concentrated water is also obtained by analyzing the water sample of the reverse osmosis concentrated water.

In conventional oxidation method, the molar ratio of the added oxidant to the COD of the reverse osmosis concentrated water (calculated by $O_2$) is 1-3:1, and it can be reduced to 0.5-1:1 in the present invention, which reduces economic input and improves economic benefits.

For reverse osmosis concentrated water with a COD of 50-250 ppm, COD can be reduced to 40-200 ppm after treatment with the precipitant and oxidant in step (1), which can only partially degrade the easily oxidizable organics.

The precipitant and oxidant can be either commercially available industrial products or recycled by-products of chemical processes.

Preferably, in step (1), the oxidant is NaClO, the precipitant is $Na_2CO_3$ and NaOH, the precipitant and oxidant are derived from chlorine alkali industry waste water; in the chlorine alkali industry waste water, the available chlorine content is 2-4 wt %, the $Na_2CO_3$ content is 5-10 wt %, and the NaOH content is 0.1-2 wt %.

Since in the chlorine alkali industry waste water, NaClO, $Na_2CO_3$ and NaOH are contained, the chlorine alkali industry waste water can be used as the precipitant and oxidant in step (1) of the present invention.

Chlorine alkali industry waste water mainly contains NaOH, $Na_2CO_3$ and low concentration of NaClO ($NaHCO_3$ also exists under weakly alkaline conditions). Since the available chlorine content is low, the chlorine alkali industry waste water is difficult to be sold as a product. If the chlorine alkali industry waste water is directly discharged, it not only causes a large amount of waste of water resources, but also causes great harm to the environment and human life. At present, in the treatment scheme of chlorine alkali industry waste water containing sodium hypochlorite, the catalytic decomposition is mostly carried out, the sodium hypochlorite is rapidly catalytically decomposed by a catalyst to eliminate sodium hypochlorite, and thereby the treatment of chlorine alkali industry waste water containing sodium hypochlorite is completed. The general treatment route thereof is: using $Na_2SO_3$ or $H_2O_2$ to reduce NaClO in wastewater, and adjusting pH of the wastewater to 6-9 by HCl and discharging the wastewater to sea. A large amount of reagent is consumed in the current treatment scheme. The present application uses NaClO, $Na_2CO_3$, $NaHCO_3$ and NaOH in the chlorine alkali industry waste water as an oxidant and precipitant for treating reverse osmosis concentrated water, and uses NaClO in the chlorine alkali industry waste water for oxidation reaction to reduce COD in the reverse osmosis concentrated water, and uses $Na_2CO_3$, $NaHCO_3$ and NaOH in the chlorine alkali industry waste water for precipitation reaction to remove the hardness ions such as $Ca^{2+}$, $Mg^{2+}$ and the like in the reverse osmosis concentrated water. The treatment of reverse osmosis concentrated water using chlorine alkali industry waste water not only saves the cost of oxidant and precipitant used in the treatment of reverse osmosis concentrated water, but also saves the cost of the reductant used in chlorine alkali industry waste water treatment, it effectively uses the effective substances in the chlorine alkali industry waste water to achieve the purpose of treating waste by waste, which can avoid economic waste, relieve environmental pressure and significantly improve economic benefit.

Preferably, in step (1), the dosage of the chlorine alkali industry waste water is 2-50 kg per ton of the reverse osmosis concentrated water, preferably is 2-40 kg per ton of the reverse osmosis concentrated water, to satisfy the dosage of oxidant and precipitant as required by reverse osmosis concentrated water treatment.

To facilitate filtering, when the oxidant and precipitant (or the chlorine alkali industry waste water containing an oxidant and a precipitant) are added to the reverse osmosis concentrated water in step (1), polyaluminum chloride (PAC) and/or polyacrylamide (PAM) can be added thereinto. The adding amount of polyaluminum chloride (PAC) and polyacrylamide (PAM) is growing until the appearance of large floccule.

In step (1), after the oxidation reaction and the precipitation reaction, the precipitation can be removed by any suitable method in the art, such as filtering, and the employed filtering apparatus can be any filtering apparatus known in the art, preferably sedimentation tank, sand filter, multi-media filter, etc. The precipitate produced is subjected to a pressure filtration using a plate and frame filter press; due to the slow decomposition of $ClO^-$ under the alkaline environment in the catalytic oxidation reaction, the degradation of organics is poor, while in acidic environment, the catalyst is easy to lose (the heavy metal active components in the catalyst is lost with the loss of the catalyst), and the effluent water is difficult to meet the emission requirements. Therefore, the pH of the clear liquid after removing precipitate is adjusted to 6-9, preferably 7-8, in a clarifier, which can make $ClO^-$ decompose fast, improve the degradation ability of organics, and make the effluent water meet emission standards on the premise of preventing the catalyst from loss.

The clear liquid after the precipitate is removed may also contain impurities such as suspending particles, colloids and fine precipitates. These impurities are easy to block the micro pores of the catalyst and adsorbent, causing failure or life reduction of the catalyst and adsorbent. Therefore, preferably before the clear liquid is subjected to catalytic oxidation treatment, the clear liquid is subjected to a second filtration using a filtering apparatus to remove such impurities, which are mainly include particles having a particle diameter of more than 4 μm. The filtering apparatus used for the second filtration comprises one or more of a sand filter apparatus, an activated carbon filter, a multi-media filter, a wire mesh filter, a microfiltration apparatus and a security filter, preferably a multi-media filter.

Preferably, in step (1), the reaction time of the catalytic oxidation is 0.5-2 h, preferably 0.5-1.5 h, and an appropriate reaction time can decompose and remove the organics in the reverse osmosis concentrated water as much as possible, to reduce the COD value of the reverse osmosis concentrated water, meanwhile most of the oxidant introduced is decomposed. For example, as to the reverse osmosis concentrated water having a COD of 50-300 ppm, after catalytical oxidization for the above reaction time, the COD thereof can be reduced to 20-80 ppm. At this time, there is still a part of organics in the catalytic oxidation product water, and when its COD is more than 50 ppm, the organics can be adsorbed into the micropore of the adsorbent by adsorption treatment, thereby reducing the COD value to below 50 ppm. The adsorbent can be any adsorbent in the art, such as activated carbon. As to the reverse osmosis concentrated water having a COD of 50-200 ppm, its COD can be directly treated to below 50 ppm after catalytic oxidation treatment without adsorption treatment.

The adsorption treatment can be carried out in any adsorption apparatus known in the art, such as an adsorption tower, an overflow weir, etc., which can be loaded with an adsorbent, preferably an adsorption tower. The employed adsorption tower can be one or more and can be connected in parallel or in series, and is preferably a fixed bed activated carbon adsorption tower. The catalyst oxidation product water of the present invention preferably has a residence time of 0.5-4 h, preferably 1-2 h, in the adsorption tower.

The adsorbent of the adsorption equipment used in the adsorption treatment is an adsorbing material having a specific surface area of 500-2000 $m^2/g$ and a mechanical strength of 50-100 N/cm, such as one or more of activated carbon, molecular sieve and macroporous adsorption resin, preferably activated carbon, more preferably coal-like cylindrical activated carbon, the coal-like cylindrical activated carbon has a particle size of 1-5 mm and an iodine value of 1000-1200.

Preferably, in step (1), the catalyst comprises aluminum oxide and nickel, iron, manganese and cerium loaded on the aluminum oxide in the form of oxide; by weight of the aluminum oxide, the components in the catalyst have contents as follows:

nickel 5.0-20 wt %, preferably 5.5-12.0 wt %;
iron 0.5-5.5 wt %, preferably 1.5-5.0 wt %;
manganese 0.5-3.5 wt %, preferably 1.0-3.0 wt %;
cerium 1.5-3.0 wt %, preferably 2.0-2.8 wt %.

Nickel is the main active component, iron, manganese and cerium are used as a modifier (i.e., a catalyst assistant) and used to modify the performance of catalyst, and improve the catalytic effect of catalyst, the modifier can also be other conventional modifiers used in the art.

Preferably, the catalyst comprises cerium modified aluminum oxide carrier and nickel, iron, manganese and cerium in the form of oxide loaded on the cerium modified aluminum oxide carrier; the cerium modified aluminum oxide carrier comprises aluminum oxide and cerium in the form of oxide loaded on the aluminum oxide; based on the weight of the aluminum oxide, the content of cerium in the cerium modified aluminum oxide carrier is 1.0-2.0 wt %, preferably 1.2-1.5 wt %.

Since the cerium modified aluminium oxide carrier is obtained by loading cerium on the aluminum oxide (the cerium is present in the form of oxide), the cerium modified aluminum oxide carrier comprises aluminum oxide and cerium in the form of oxide loaded on the aluminum oxide.

Since the catalyst is obtained by further loading nickel, iron, manganese and cerium on the cerium modified aluminum oxide carrier (the nickel, iron, manganese and cerium are all present in the form of oxide), the catalyst comprises cerium modified aluminum oxide carrier and nickel, iron, manganese and cerium in the form of oxide loaded on the cerium modified aluminum oxide carrier.

Preferably, based on the weight of the aluminum oxide, the cerium loaded on the cerium modified aluminum oxide carrier in the catalyst has a content of 0.5-2.0 wt %, preferably 0.6-1.5 wt %.

The content of cerium loaded on the cerium modified aluminum oxide carrier in the catalyst refers to the cerium content when nickel, iron, manganese and cerium are further loaded on the cerium modified aluminum oxide carrier, the content of this part of cerium corresponds to the total cerium content in the catalyst minus the content of cerium in the cerium modified aluminum oxide carrier.

When the carrier is a cerium modified aluminum oxide carrier, the cerium is present in two parts in the catalyst, one part is present in the cerium modified aluminum oxide carrier. The cerium in the cerium modified aluminum oxide carrier is highly dispersed on the aluminum oxide, physically divides the inner surface of the aluminum oxide, and can form a strong interaction with the aluminum oxide, which plays an anchoring role. When the main active component and the modifier are introduced, the cerium in the cerium modified aluminum oxide carrier also plays a guiding role so as to disperse the main active component evenly and prevent aggregation. Another part of cerium is present in the load of the cerium modified aluminum oxide carrier (i.e., the main active component and the modifier). Due to the anchoring and guidance roles of the cerium in the cerium modified aluminum oxide carrier, the interaction force among the active components-cerium oxide-aluminum oxide (i.e., $NiO_x$—$CeO_2$—$Al_2O_3$, wherein $NiO_x$ is the oxide of the main active component on the catalyst, x represents 2 or 3, because $Ni^{2+}$ and $Ni^{3+}$ are both present in $NiO_x$, the number of O atom in the oxide of the main active component is represented by x) in the catalyst is stronger than the interaction between the active component-aluminum oxide ($NiO_x$—$Al_2O_3$). Therefore, the aggregation and loss of the active components can be effectively reduced, which is especially suitable for long-term treatment of wastewater that is difficult to be biochemically treated, with better activity and processing effect, low operating cost.

In addition, cerium has a good oxygen storage function. The production of active oxygen radicals by oxidant on the main active components of the catalyst is the key to degradation of organics. While the carrier of catalyst is cerium modified aluminum oxide carrier, when the catalyst conducts catalytic oxidation to the oxidant (such as sodium hypochlorite), the active oxygen radicals generated by oxidant on the main active component of the catalyst can be migrated to the cerium of the cerium modified aluminum oxide carrier for storage, which increases the sites of active oxygen radicals, increases the reaction sites, and increases the degradation rate and degradation amount of organics.

For example, while the carrier of the catalyst is cerium modified aluminum oxide carrier and the oxidant is sodium hypochlorite, $ClO^-$ generates active oxygen radicals on $NiO_x$, and the structure of $NiO_x$—$CeO_2$—$Al_2O_3$ can timely migrate the active oxygen radicals generated on $NiO_x$ onto $CeO_2$, thereby the number of reaction sites is increased, the organics are effectively degraded, and COD removal rate is improved. The catalytic oxidation mechanism is as follows:

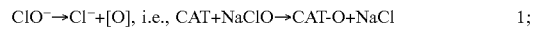

$$ClO^- \rightarrow Cl^- + [O], \text{ i.e., } CAT + NaClO \rightarrow CAT\text{-}O + NaCl \qquad 1;$$

$$ORG + CAT\text{-}O \rightarrow ORG\text{-}O + CAT \qquad 2;$$

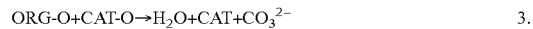

$$ORG\text{-}O + CAT\text{-}O \rightarrow H_2O + CAT + CO_3^{2-} \qquad 3.$$

Wherein, [O] represents active oxygen radicals, CAT represents a catalyst, ORG represents organics, CAT-O represents active sites on the catalyst, [O] is present at the active sites, and ORG-O represents organics combinated with [O]. Formula 1 is a process in which sodium hypochlorite is catalyzed by the catalyst to produce [O]; Formula 2 is a process in which the catalyst having an [O] active sites is contacted with organics to transfer [O] onto the organics; Formula 3 is a process in which the organics combined with [O] degrade into small molecules or carbon dioxide and water under the action of catalyst.

Preferably, the aluminum oxide in the catalyst carrier has: a particle size of 1.0-2.0 mm, preferably 1.5-2.0 mm; a bulk density of 0.30-0.50 g/ml, preferably 0.40-0.48 g/ml; a water absorption of 50-70 vol %, preferably 55-60 vol %; a specific surface area of 150-250 $m^2/g$, preferably 180-220 $m^2/g$; a pore volume of 1.2-1.8 ml/g, preferably 1.5-1.7 ml/g; an average pore diameter of 100-150 nm, preferably 130-145 nm.

Some organics which are difficult to be degraded in wastewater are usually macromolecules. Using aluminum oxide with high pore volume and pore diameter can provide proper pore channels, which facilitates the diffusion of macromolecular organics into the active sites inside the catalyst, so as to improve the treatment effects of catalytic oxidation and effectively degrade the macromolecular organics.

The nickel, iron, manganese, cerium are respectively derived from one or more of nitrates, acetates and carbonates containing the corresponding metal elements, preferably nitrates.

The preparing method of the above catalysts comprises the following steps:

(1) adding the impregnation liquid of cerium salt to the aluminum oxide, to immerse the aluminum oxide for 30-120 min, and then drying and calcining the obtained solid to obtain the cerium modified aluminum oxide carrier; preferably the impregnation is performed with equal volume impregnation process; preferably the drying temperature is 100-130° C., the drying time is 2-5 h, the calcining temperature is 450-550° C., and the calcining time is 3-6 h; more preferably a vacuum pretreatment is performed on the aluminum oxide before the impregnation, the time of the vacuum pretreatment is 10-30 min, and the vacuum degree is 96.0-98.0 KPa;

(2) adding the impregnation liquid containing a nickel salt, an iron salt, a manganese salt and a cerium salt to the cerium modified aluminum oxide carrier obtained in step (1), to immerse the cerium modified aluminum oxide carrier for 30-120 minutes, and then drying and calcining the obtained solid to obtain the catalyst; preferably the impregnation is performed with equal volume impregnation process; preferably the drying temperature is 100-130° C., the drying time is 2-5 h, the calcining temperature is 450-550° C., and the calcining time is 3-6 h.

Preferably, in the above preparation method of the catalyst, the solvent of the impregnation liquid in steps (1) and (2) is selected from the group consisting of water, methanol, ethanol, and any combination thereof, preferably water and/or ethanol, more preferably the ethanol aqueous solution with an ethanol concentration of 10-40 wt %.

Preferably, in the preparing method of the above catalyst, the content of cerium in the impregnation liquid in step (1) is 1.0-2.0 wt %, preferably 1.2-1.5 wt %, based on the weight of the aluminum oxide in the carrier; the content of cerium in the impregnation liquid of step (2) is 0.5-2.0 wt %, preferably 0.6-1.5 wt %; the content of nickel is 5.0-20 wt %, preferably 5.5-12.0 wt %; the content of iron is 0.5-5.5 wt %, preferably 1.5-5.0 wt %; the content of manganese is 0.5-3.5 wt %, preferably 1.0-3.0 wt %; the total content of cerium in the impregnation liquid of steps (1) and (2) is 1.5-3.0 wt %, preferably 2.0-2.8 wt %.

Preferably, in the above preparation method of the catalyst, the cerium salt in step (1) and the nickel salt, iron salt, manganese salt and cerium salt in step (2) are one or more of nitrate, acetate and carbonate containing the corresponding metal elements, preferably nitrate ($Ce(NO_3)_3$, $Ni(NO_3)_2$, $Fe(NO_3)_3$, and $Mn(NO_3)_2$).

The aluminum oxide of the carrier can be aluminum oxide of any shape, such as spherical, cylindrical, clover pattern, four-leaf clover pattern, gear spherical, preferably spherical aluminum oxide.

The oxidant, such as NaClO, has a low reaction rate at normal temperature with no catalyst, and NaClO mainly decomposes to form $Cl^-$ and $O_2$, resulting in a low concentration of the obtained active oxygen radicals [O]. [O] has a strong oxidation ability and can degrade macromolecular organics to small molecule organics, at the same time completely decomposes the small molecule organics to carbon dioxide and water, can degrade various compounds, such as amines, aldehydes, phenols, esters, aromatic hydrocarbons, halogenated hydrocarbons, and can also achieve the purpose of decolorization and deodorization in the meanwhile. The above catalyst facilitates the formation from $ClO^-$ to $Cl^-$ and [O], reduces the formation of $O_2$, and avoids a waste of oxidant.

As to the conventional oxidation method, the molar ratio of the addition amount of oxidant to the COD of reverse osmosis concentrated water is 1-3:1. After using the above catalyst, the COD removal rate in the wastewater can be increased from the conventional 20-40% to 60-80%. At the same time, due to making the most of oxidant, the molar ratio of the addition amount of oxidant to COD of reverse osmosis concentrated water can be reduced to 0.5-1:1, which reduces economic input and improves economic efficiency.

After the reverse osmosis concentrated water is treated in step (1), the first-stage treated water is obtained, both the hardness and COD value thereof are decreased, which can meet the inflow water index of reverse osmosis apparatus shown in Table 1, and is used as the reverse osmosis inflow water in step (2) for reverse osmosis treatment.

TABLE 1

Index of reverse osmosis inflow water

| Items | Values | Unit |
| --- | --- | --- |
| COD | <50 | ppm |
| pH | 6-9 | / |

TABLE 1-continued

Index of reverse osmosis inflow water

| Items | Values | Unit |
| --- | --- | --- |
| $SiO_2$ | <40 | ppm |
| Hardness (calculated by $CaCO_3$) | <800 | ppm |

In step (2), the membrane module of the reverse osmosis apparatus used in the reverse osmosis treatment is of flat plate type, tubular type, roll type or hollow fiber type, preferably roll type. The membrane in the membrane module is a cellulose acetate membrane or an aromatic polyamide membrane, preferably an aromatic polyamide membrane. The membrane can withstand an absolute pressure of 1-2 Mpa, and the water recovery rate of the reverse osmosis membrane is 75-85 wt %.

In step (2), in order to prevent contamination and scratching of the membrane in the reverse osmosis apparatus because of abnormal water quality, it is preferred to install a security filter before the reverse osmosis apparatus to filter out the impurities in the first-stage treated water and then conduct the reverse osmosis treatment, so as to improve the effect of reverse osmosis treatment and prolong the service life of reverse osmosis apparatus.

In step (2), the obtained second-stage reverse osmosis product water can be directly reused. The indexes of the second-stage reverse osmosis product water are shown in Table 2. If the indexes as shown in Table 2 are not reached, the treatment is continued until the indexes are reached, and then obtained second-stage reverse osmosis product water is reused; the obtained second-stage reverse osmosis concentrated water indexes are shown in Table 3. If the indexes as shown in Table 3 are not reached, the treatment will be continued until the indexes are reached. Then the reverse osmosis concentrated water which meet the indexes as shown in Table 3 are subjected to the oxidation treatment of step (3) to reduce the COD value thereof, wherein some of the organics are decomposed to $CO_2$ and water, and the macromolecular organics are decomposed to small molecular organics; the oxidant used is one or more of NaClO, $H_2O_2$, $NaClO_3$, $Cl_2$, $ClO_2$, the molar ratio of the addition amount of oxidant to the COD of the second-stage reverse osmosis concentrated water (calculated by $O_2$) is 0.5-1.0:1.

TABLE 2

Indexes of the second-stage reverse osmosis product water

| Items | Values | Unit |
| --- | --- | --- |
| COD | ≤5 | ppm |
| ammonia nitrogen | ≤0.5 | ppm |
| TDS | ≤200 | ppm |
| conductivity | ≤300 | us/cm |

TABLE 3

Indexes of the second-stage reverse osmosis concentrated water

| Items | Values | Unit |
| --- | --- | --- |
| COD | 100-250 | ppm |
| pH | 6-9 | / |
| $SiO_2$ | 10-40 | ppm |

TABLE 3-continued

Indexes of the second-stage reverse osmosis concentrated water

| Items | Values | Unit |
|---|---|---|
| Hardness (calculated by $CaCO_3$) | 100-2000 | ppm |

In step (3), in the oxidation reaction liquid obtained after the oxidation treatment, the oxidant not completely reacted may still exist, if an adsorption treatment is conducted directly, the adsorbent may be oxidized to reduce the life of adsorbent, and even the water quality of the effluent obtained finally would be affected. Therefore, in step (3), preferably, firstly the pH of the oxidation reaction liquid is adjusted to 6-9, then a reductant is added thereinto so as to remove the excess oxidant. The reductant is selected from the group consisting of $Na_2SO_3$, $Na_2S_2O_3$, $H_2O_2$, $Na_2S$, $FeSO_4$, $H_2$, and any combination thereof, and the molar ratio of the reductant to the excess oxidant is 0.9-1.5:1, preferably is 0.9-1.1:1. Considering that the reaction liquid after the above treatment may still contains particles or precipitates, a pretreatment of filtration can be employed, and the filtering apparatus can be selected from the group consisting of a sand filter apparatus, an activated carbon filter, a multi-media filter, a wire mesh filter, a microfiltration apparatus, a security filter, and any combination thereof, preferably a multi-media filter. If the COD≤50 ppm in the reaction liquid after the above series of treatments, then the reaction liquid can meet the standard of GB 31571-2015 in Table 2, and can be discharged as effluent water; if the COD>50 ppm in the reaction liquid after the above treatment, then an adsorbent needs to be added thereinto for adsorption treatment, making the COD≤50 ppm, and the reaction liquid meets the standard of GB 31571-2015 in Table 2 and can be discharged as effluent water. Similarly, the adsorption treatment can be carried out in any adsorption apparatus known in the art, such as adsorption tower and overflow weir, which can be loaded with adsorbents, preferably adsorption tower. The adsorbent used in the adsorption treatment is an adsorbing material having a specific surface area of 500-2000 $m^2/g$ and a mechanical strength of 50-100 N/cm, such as one or more of activated carbon, molecular sieve and macroporous adsorption resin, preferably activated carbon. The time of adsorption treatment is 1-4 h.

In step (3), the effluent water is the water from the reverse osmosis concentrated water which is treated by the method of the present invention and meets the standard of GB 31571-2015 in Table 2, and can be directly discharged.

Preferably, the method comprises the following steps:

(1) firstly adjusting the pH of the reverse osmosis concentrated water to 9.5-11.5, then adding thereinto the precipitant and oxidant for treatment, filtering to obtain a clear liquid, adjusting pH of the clear liquid to 7-8, and then filtering by a multi-media filter, adding a catalyst to the obtained filtrate to carry out catalytic oxidation to obtain a reaction liquid, and then subjecting the reaction liquid to an adsorption treatment in an adsorption apparatus to obtain a first-stage treated water;

(2) performing reverse osmosis treatment on the obtained first-stage treated water of step (1) to obtain second-stage reverse osmosis product water and second-stage reverse osmosis concentrated water, wherein the second-stage reverse osmosis product water is used for recycling;

(3) adding sodium hypochlorite to the second-stage reverse osmosis concentrated water obtained in step (2) for oxidation treatment to obtain an oxidation reaction liquid, adjusting the pH of the oxidation reaction liquid to 6-9, and then adding a reductant such as $Na_2SO_3$ thereinto to remove excess sodium hypochlorite, and then subjecting the obtained liquid to an adsorption treatment in an adsorption apparatus to obtain effluent water, wherein the effluent water is used for directly discharging.

The beneficial effects of the present invention lie in:

(1) Through the treating method of the reverse osmosis concentrated water of the present invention, such as the treatments of steps (1), (2) and (3), the organics and hardness ions in the reverse osmosis concentrated water can be removed by using a precipitant and an oxidant, and not only 75-85 wt % of the water can be recovered, but also the overall utilization rate of the water is improved. Meanwhile, the remaining water accounting for a small amount of the water is treated to meet the requirements of GB 31571-2015 in Table 2 and then discharged as effluent water. The method is environment friendly, has low economic input, simple and easy to operate;

(2) The chlorine alkali industry waste water can be effectively treated, and the oxidizability of a small amount of sodium hypochlorite contained in the chlorine alkali industry waste water can be fully utilized to achieve the treatment of refractory organic pollutants in the reverse osmosis concentrated water. The method makes full use of NaOH, $Na_2CO_3$ and $NaHCO_3$ contained in the chlorine alkali industry waste water to perform precipitation reactions so as to remove $Ca^{2+}$, $Mg^{2+}$ and $SiO_2$, etc., in the reverse osmosis concentrated water, which not only saves the cost of the oxidant and precipitant used in the reverse osmosis concentrated water treatment, but also saves the cost of reductant used in the chlorine alkali industry waste water treatment, effectively utilizes the effective substances in the chlorine alkali industry waste water, achieves the purpose of treating waste by waste, avoids economic waste, relieves environmental pressure, and significantly improves economic benefits;

(3) The catalyst used in the present invention can promote the oxidant to produce [O], improve the oxidizing ability of oxidant, and cooperate with the high-efficiency adsorption process to make the COD of the reverse osmosis concentrated water which is difficult to be oxidized less than or equal to 50 ppm and meet the national standard GB 31571-2015 in Table 2. Meanwhile, due to the increased utilization rate of oxidant, its addition amount is greatly reduced, and the economic benefits are significant.

EMBODIMENTS

The technical solutions of the present invention and the effects thereof are further illustrated by the following specific examples. The following examples are only for explaining the contents of the present invention, and are not intended to limit the scope of the present invention. Simple changes to the present invention without departing from the spirit of the present invention are within the scope as claimed in the invention.

The apparatus used in Examples 1-11 and Comparative Examples 1-3 of the present invention were as follows:

Plate and frame filter press, model XMKG70/1000-U, purchased from Wuxi General Machinery Co., Ltd.;

Oxidation tower, multi-media filter, activated carbon adsorption tower, security filter, sand filter apparatus, microfiltration apparatus and roll reverse osmosis membrane module, all of the above were purchased from Maiwang Environmental Engineering Technology Co., Ltd.;

Reverse osmosis membrane, model SWC series seawater desalination membrane, purchased from Hydranautics Nitto Denko, U.S.; activated carbon, purchased from Yantai General Activated Carbon Co., Ltd.;

Muffle furnace, model VULCAN 3-1750, purchased from Neytech Inc., U.S.

In Examples 1 to 11 and Comparative Examples 1 to 3 of the present invention, the raw materials were as follows:

NaClO, Na$_2$CO$_3$, and NaOH, analytically pure, purchased from Xilong Chemical Co., Ltd.;

PAC, analytically pure, purchased from Tianjin Kermel Chemical Reagent Co., Ltd.;

PAM, model AN923SH, purchased from the SNF Floerger, France;

Na$_2$SO$_3$, analytically pure, purchased from Sinopharm Chemical Reagent Co., Ltd.;

Hydrochloric acid, 37 wt %, purchased from Sinopharm Chemical Reagent Co., Ltd.;

FeSO$_4$.7H$_2$O, analytically pure, purchased from Xilong Chemical Co., Ltd.;

H$_2$O$_2$ solution, 30 wt %, purchased from Sinopharm Chemical Reagent Co., Ltd.;

Nickel nitrate, iron nitrate, cerium nitrate and manganese nitrate, analytically pure, purchased from Xilong Chemical Co., Ltd.;

Ethanol, analytically pure, purchased from Sinopharm Chemical Reagent Co., Ltd.

Example 1: Preparation of 1# Catalyst 15 g of spherical aluminum oxide carrier (about 50 ml) from the Shandong Zibo Wufeng Aluminum Magnesium Co., Ltd. was taken and placed in a vacuum impregnation bottle for vacuum pretreatment, the vacuum pretreatment time was 30 min, and the vacuum degree was 96.0 KPa; at the same time, 12 ml of nickel nitrate aqueous solution containing 0.15 g/ml of nickel, 2.3 ml of iron nitrate aqueous solution containing iron of 0.10 g/ml, 3.0 ml of manganese nitrate aqueous solution containing manganese of 0.10 g/ml, and 2.0 ml of cerium nitrate aqueous solution containing cerium 0.15 g/ml were taken and added to an ethanol solution having an ethanol concentration of 10 wt % so as to prepare an impregnation liquid having a total volume of 25 ml. The above impregnation liquid was added to the vacuum impregnation bottle loaded with the above spherical aluminum oxide carrier, uniformly mixed. Then the above-mentioned spherical aluminum oxide carrier was subjected to an equal volume impregnation for 30 min, taken out, and dried in an oven at 110° C. for 3 h, and then calcined at 500° C. for 6 h in a muffle furnace so as to obtain 1# catalyst.

In the obtained 1# catalyst, based on the weight of the aluminum oxide, the contents of the components were as follows: nickel 12.0 wt %, iron 1.5 wt %, manganese 2.0 wt %, and cerium 2.0 wt %.

Example 2: Preparation of 2# Catalyst 15 g of the spherical aluminum oxide carrier (about 30 ml) from Yantai Baichuan Huitong Technology Co., Ltd. was taken and placed in a vacuum impregnation bottle for vacuum pretreatment, the vacuum pretreatment time was 30 min and the vacuum degree was 98.0 KPa; meanwhile, 16 ml of nickel nitrate aqueous solution containing 0.15 g/ml of nickel, 0.9 ml of iron nitrate aqueous solution containing 0.10 g/ml of iron, 1.5 ml of manganese nitrate aqueous solution containing 0.10 g/ml of manganese, 2.5 ml of cerium nitrate aqueous solution containing 0.15 g/ml of cerium were taken and added into deionized water to prepare an impregnation liquid with a total volume of 21 ml. The above impregnation liquid was added to the vacuum impregnation bottle loaded with the above spherical aluminum oxide carrier and uniformly mixed. Then the above-mentioned spherical aluminum oxide carrier was subjected to an equal volume impregnation for 60 min, taken out, and dried in an oven at 130° C. for 2 h, then calcined at 480° C. for 6 h in a muffle furnace to obtain 2# catalyst.

In the obtained 2# catalyst, based on the weight of the aluminum oxide, the contents of the following components were as follows: nickel 16.0 wt %, iron 0.6 wt %, manganese 1.0 wt %, cerium 2.5 wt %.

Example 3: Preparation of 3# Catalyst 15 g of spherical aluminum oxide carrier (about 30 ml) from Shandong Yantai Baichuan Huitong Technology Co., Ltd. was taken and placed in vacuum impregnation bottle for vacuum pretreatment, and vacuum pretreatment time was 20 min, the vacuum degree was 97.5 KPa; 6.0 ml of a cerium nitrate aqueous solution containing 0.05 g/ml of cerium was added to an ethanol aqueous solution having an ethanol concentration of 30 wt %, so as to prepare an impregnation liquid with a volume of 21 ml. The impregnation liquid was added to the vacuum impregnation bottle and uniformly mixed to perform an equal volume impregnation on the spherical aluminum oxide carrier for 30 min, then the aluminum oxide carrier was taken out, and dried in an oven at 120° C. for 3 h, then calcined in a muffle furnace at 500° C. for 4 h, to obtain an cerium modified aluminum oxide carrier. In the cerium modified aluminum oxide carrier, the content of cerium was 2.0 wt % based on the weight of aluminum oxide.

15 g of the above cerium modified aluminum oxide carrier (about 30 ml) was taken and placed in a vacuum impregnation bottle for vacuum pretreatment, the vacuum pretreatment time was 30 min, the vacuum degree was 98.0 KPa; meanwhile 16 ml of nickel nitrate aqueous solution containing 0.15 g/ml of nickel, 0.9 ml of iron nitrate aqueous solution containing 0.10 g/ml of iron, 1.5 ml of manganese nitrate aqueous solution containing 0.10 g/ml of manganese, 1.5 ml of cerium nitrate containing cerium 0.05 g/ml of cerium were taken and added to deionized water to obtain an impregnation liquid with a total volume of 21 ml. The obtained impregnation liquid was added to the vacuum impregnation bottle containing the above-described cerium modified aluminum oxide carrier, and uniformly mixing to perform an equal volume impregnation on the above-mentioned cerium modified aluminum oxide carrier for 60 min, taken out, and dried in an oven at 130° C. for 2 h, then calcined in a muffle furnace at 480° C. for 6 h to obtain 3# catalyst.

The physicochemical properties of the above-described spherical aluminum oxide carrier are as follows: having a particle size of 1.5-2.0 mm, a bulk density of 0.50 g/ml, a water absorption of 70 vol %, a specific surface area of 250 m$^2$/g, a pore volume of 1.20 ml/g, and an average pore diameter of 130 nm.

In the obtained 3# catalyst, based on the weight of the aluminum oxide, the contents of ingredients were as follows: nickel 16.0 wt %, iron 0.6 wt %, manganese 1.0 wt %, cerium 2.5 wt %.

Example 4: Preparation of 4# Catalyst 15 g of the spherical aluminum oxide carrier (about 50 ml) from the Shandong Zibo Wufeng Aluminum Magnesium Co., Ltd. was taken and placed in a vacuum impregnation bottle for vacuum pretreatment, the vacuum pretreatment time was 30 min, the vacuum degree was 98.0 KPa; 3.0 ml of a cerium nitrate aqueous solution containing 0.05 g/ml of cerium was added to an ethanol solution having an ethanol concentration of 20 wt % to prepare an impregnation liquid having a volume of 25 ml, and the impregnation liquid was added to the vacuum impregnation bottle and uniformly mixed to perform an equal volume impregnation on the above-mentioned spherical aluminum oxide carrier for 60 min, then the spherical aluminum oxide carrier was taken out, and dried in an oven at 120° C. for 2 h, and then calcined at 450° C. in a muffle furnace for 5 h to obtain a cerium modified aluminum oxide carrier. In the obtained cerium modified aluminum oxide carrier, the cerium content was 1.0 wt % based on the weight of aluminum oxide.

15 g of the above cerium modified aluminum oxide carrier (about 50 ml) was placed in a vacuum impregnation bottle for vacuum pretreatment, the vacuum pretreatment time was 30 min, and the vacuum degree was 96.0 KPa. Meanwhile, 12 ml of nickel nitrate aqueous solution containing 0.15 g/ml of nickel, 2.3 ml of iron nitrate aqueous solution containing iron of 0.10 g/ml, 3.0 ml of manganese nitrate aqueous solution containing 0.10 g/ml of manganese, 3.0 ml of cerium nitrate aqueous solution containing 0.05 g/ml of cerium were added to the ethanol aqueous solution having an ethanol concentration of 10 wt %, to obtain an impregnation liquid having a total volume of 25 ml. The obtained impregnation liquid was added to the vacuum impregnation bottle loaded with the above cerium modified aluminum oxide carrier and uniformly mixed to perform an equal volume impregnation on the above-mentioned cerium modified aluminum oxide carrier for 60 min. Then the cerium modified aluminum oxide carrier was taken out, and placed in an oven at 110° C. for 3 h, then calcined at 500° C. in a muffle furnace for 6 h to obtain 4# catalyst.

The physicochemical properties of the above spherical aluminum oxide carrier are as follows: having a particle size of 1.0-1.5 mm, a bulk density of 0.30 g/ml, a water absorption of 50 vol %, a specific surface area of 150 m²/g, a pore volume of 1.80 ml/g, and an average pore diameter of 150 nm.

In the obtained 4# catalyst, based on the weight of the aluminum oxide, the contents of ingredients were as follows: nickel 12.0 wt %, iron 1.5 wt %, manganese 2.0 wt %, and cerium 2.0 wt %.

In the following examples, the sampling analysis results of reverse osmosis concentrated water in the raw materials used are shown in Table 4. The main components of the chlorine alkali industry waste water are shown in Table 5.

TABLE 4

The sampling analysis results of reverse osmosis concentrated water

| Reverse osmosis concentrated water | COD/ppm | TDS/ppm | pH | Suspension/ppm | $Mg^{2+}$/ppm | $SiO_2$/ppm | $NH_4^+$/ppm | $Ca^{2+}$/ppm |
|---|---|---|---|---|---|---|---|---|
| Example 5 | 300 | 10000 | 9 | 1000 | 200 | 150 | 50 | 1000 |
| Example 6 | 50 | 2000 | 6 | 50 | 50 | 50 | 5 | 200 |
| Example 7 | 210 | 5000 | 7.2 | 122 | 120 | 30 | 15 | 500 |
| Example 8 | 158 | 5000 | 8.1 | 500 | 500 | 120 | 45 | 800 |
| Example 9 | 50 | 2000 | 6 | 50 | 50 | 50 | 5 | 200 |
| Example 10 | 158 | 5000 | 8.1 | 500 | 500 | 120 | 45 | 800 |
| Example 11 | 300 | 10000 | 9 | 1000 | 200 | 150 | 50 | 1000 |
| Comparative Example 1 | 300 | 10000 | 9 | 1000 | 200 | 150 | 50 | 1000 |
| Comparative Example 2 | 50 | 2000 | 6 | 50 | 50 | 50 | 5 | 200 |
| Comparative Example 3 | 158 | 5000 | 8.1 | 500 | 500 | 120 | 45 | 800 |

TABLE 5

Main components of chlorine alkali industry waste water

| | Chlorine alkali industry waste water | | |
|---|---|---|---|
| | NaClO/wt % | $Na_2CO_3$/wt % | NaOH/wt %/ |
| Example 5-8 and 11, and Comparative Example 3 | 2 | 9 | 1 |

Example 5: Treatment of Reverse Osmosis Concentrated Water (1# Catalyst+Chlorine Alkali Industry Waste Water)

Step (1): The reverse osmosis concentrated water shown in Table 4 was taken and adjusted to pH of 11 with NaOH in a regulating tank, then fed into a reaction tank; the chlorine alkali industry waste water as shown in Table 5 was added into the reaction tank (the addition amount was 28 kg per ton of the reverse osmosis concentrated water), and a PAC and PAM solution was added until the appearance of large floccule, mixed and reacted for 1 h. After the reaction, the precipitation was filtered by a plate and frame filter press, and the most of solid waste was $CaCO_3$ and $Mg(OH)_2$, which can be used as a raw material for building materials. The clear liquid obtained after filtration was fed into a clarification tank to adjust its pH to 8 with HCl, and stayed herein for 1 h. After the above sodium hypochlorite oxidation and the process of reducing hardness and silicon, the COD of the reverse osmosis concentrated water was reduced to 240 ppm, and then the reverse osmosis concentrated water was fed into a multi-media filter for filtration. The obtained filtrate was fed into an oxidation tower loaded with 1# catalyst and stayed for 90 min. After the above catalytic oxidation reaction, the COD thereof was reduced to 80 ppm, and the removal rate of COD was 73.3%. Then the filtrate was fed into an activated carbon adsorption tower for adsorption treatment. After adsorption treatment for 1 h, the effluent water had a COD of 38 ppm, a pH of 8, a $SiO_2$ content of 10 ppm, and a hardness (calculated by $CaCO_3$) of 290 ppm.

Step (2): The effluent water of the activated carbon adsorption tower was subjected to a secondary filtration by a security filter, and the obtained filtrate was fed into a roll reverse osmosis membrane module for reverse osmosis treatment; the water recovery rate was 75 wt %, and second-stage reverse osmosis product water and second-stage reverse osmosis concentrated water were obtained.

Step (3): The obtained second-stage reverse osmosis product water (COD was 5 ppm, ammonia nitrogen was 0.4 ppm, TDS was 100 ppm, and conductivity was 190 μs/cm) was reused as recycling water. The obtained second-stage reverse osmosis concentrated water (COD was 152 ppm, pH was 8.5, $SiO_2$ content was 49 ppm, hardness (calculated by $CaCO_3$) was 1188 ppm) was fed into an oxidation unit for continued processing. Specifically, 10 wt % of NaClO solution was added to the obtained second-stage reverse osmosis concentrated water (the addition amount was 3.5 Kg per ton of the second-stage reverse osmosis concentrated water), and the mixed liquid was reacted in the oxidation device for 1 h and then fed into a regulating tank to adjust its pH to 7.5 with HCl. 10 wt % of $H_2O_2$ was added (the addition amount was 1.12 kg/t of the second-stage reverse osmosis concentrated water) for the reduction of excess NaClO, then the second-stage reverse osmosis concentrated water was fed into a multi-media filter, and then fed into an activated carbon adsorption tower for adsorption treatment of 2 h to obtain effluent water. The effluent water had a COD of 25 ppm, and a COD removal rate of 83.6%, which meets the national standard GB 31571-2015 as shown in Table 2.

Example 6: Treatment of Reverse Osmosis Concentrated Water (2# Catalyst+Chlorine Alkali Industry Waste Water)

Step (1): The reverse osmosis concentrated water shown in Table 4 was taken and adjusted to pH of 11 with NaOH in a regulating tank, then fed into a reaction tank; the chlorine alkali industry waste water as shown in Table 5 was added to the reaction tank (the addition amount was 2.9 kg per ton of the reverse osmosis concentrated water), and a PAC and PAM solution was added until the appearance of large floccule, mixed and reacted for 1 h. After the reaction, the precipitation was filtered by a plate and frame filter press, and the most of solid waste was $CaCO_3$ and $Mg(OH)_2$, which can be used as a raw material for building materials. The clear liquid obtained after filtration was fed into a clarification tank to adjust its pH to 7.5 with HCl, and stayed herein for 1 h. After the above sodium hypochlorite oxidation and the process of reducing hardness and silicon, the COD of the reverse osmosis concentrated water was reduced to 38 ppm, and then the reverse osmosis concentrated water was filtered by a sand filter apparatus. The obtained filtrate was fed into an oxidation tower loaded with 2# catalyst and stayed for 30 min. After the above catalytic oxidation reaction, the COD thereof was reduced to 20 ppm, the removal rate of COD was 60%, the pH was 7.8, the $SiO_2$ content was 10 ppm, and the hardness (calculated by $CaCO_3$) was 62 ppm.

Step (2): The effluent water of the oxidation tower was subjected to a secondary filtration by a security filter, and the obtained filtrate was fed into a roll reverse osmosis membrane module for reverse osmosis treatment; the water recovery rate was 85 wt %, and second-stage reverse osmosis product water and second-stage reverse osmosis concentrated water were obtained.

Step (3): The obtained second-stage reverse osmosis product water (COD was 3 ppm, ammonia nitrogen was 0.1 ppm, TDS was 40 ppm, and conductivity was 70 μs/cm) was reused as recycling water. The obtained second-stage reverse osmosis concentrated water (COD was 125 ppm, pH was 8.2, $SiO_2$ content was 50 ppm, hardness (calculated by $CaCO_3$) was 389 ppm) was fed into an oxidation unit for continued processing. Specifically, 10 wt % of NaClO solution was added to the obtained second-stage reverse osmosis concentrated water (the addition amount was 2.9 Kg per ton of the second-stage reverse osmosis concentrated water), the mixed liquid was reacted in the oxidation device for 1 h and then fed into a regulating tank to adjust its pH to 8 with HCl. $Na_2SO_3$ was added (the addition amount was 0.34 kg/t of the second-stage reverse osmosis concentrated water) for the reduction of excess NaClO, then the second-stage reverse osmosis concentrated water was fed into a multi-media filter, and then the filtrate was fed into an activated carbon adsorption tower for adsorption treatment of 2 h to obtain effluent water. The effluent water had a COD of 15 ppm, and a COD removal rate of 88.0%, which meets the national standard GB 31571-2015 as shown in Table 2.

Example 7: Treatment of Reverse Osmosis Concentrated Water (3# Catalyst+Chlorine Alkali Industry Waste Water)

Step (1): The reverse osmosis concentrated water shown in Table 4 was taken and adjusted to pH of 11 with NaOH in a regulating tank, then fed into a reaction tank; the chlorine alkali industry waste water as shown in Table 5 was added to the reaction tank (the addition amount was 24 kg per ton of the reverse osmosis concentrated water), and a PAC and PAM solution was added until the appearance of large floccule, mixed and reacted for 0.5 h. After the reaction, the precipitation was filtered by a plate and frame filter press, and the most of solid waste was $CaCO_3$ and $Mg(OH)_2$, which can be used as a raw material for building materials. The clear liquid obtained after filtration was fed into a clarification tank to adjust its pH to 8.5 with HCl and stayed herein for 1 h. After the above sodium hypochlorite oxidation and the process of reducing hardness and silicon, the COD of the reverse osmosis concentrated water was reduced to 159 ppm, and then the reverse osmosis concentrated water was filtered by a multi-media filter. The obtained filtrate was fed into a oxidation tower loaded with 3# catalyst and stayed for 60 min. After the above catalytic oxidation reaction, the COD thereof was reduced to 38 ppm, the removal rate of COD was 81.9%, the pH was 8.5, the $SiO_2$ content was 7 ppm, and the hardness (calculated by $CaCO_3$) was 150 ppm.

Step (2): The effluent water of the oxidation tower was subjected to a secondary filtration by a security filter, and the obtained filtrate was fed into a roll reverse osmosis membrane module for reverse osmosis treatment; the water recovery rate was 80 wt %, and second-stage reverse osmosis product water and second-stage reverse osmosis concentrated water were obtained.

Step (3): The obtained second-stage reverse osmosis product water (COD was 3 ppm, ammonia nitrogen was 0.2 ppm, TDS was 80 ppm, and conductivity was 170 μs/cm) was reused as recycling water. The obtained second-stage reverse osmosis concentrated water (COD was 190 ppm, pH was 8.8, $SiO_2$ content was 29 ppm, hardness (calculated by $CaCO_3$) was 760 ppm) was fed into an oxidation unit for continued processing. Specifically, 10 wt % of NaClO solution was added to the obtained second-stage reverse osmosis concentrated water (the addition amount was 4.4 Kg per ton of the second-stage reverse osmosis concentrated water), the mixed liquid was reacted in the oxidation device for 1 h and then fed into a regulating tank to adjust its pH to 6-9 with HCl; and $Na_2SO_3$ was added (the addition amount was 0.52 kg/t of the second-stage reverse osmosis concentrated water) for the reduction of excess NaClO, then the second-stage reverse osmosis concentrated water was fed into a microfiltration apparatus, and the filtrate was fed into an activated carbon adsorption tower for adsorption treatment of 3 h, to obtain effluent water. The effluent water had a COD of 41 ppm, and a COD removal rate of 78.4%, which meets the national standard GB 31571-2015 as shown in Table 2.

Example 8: Treatment of Reverse Osmosis Concentrated Water (4# Catalyst+Chlorine Alkali Industry Waste Water)

Step (1): The reverse osmosis concentrated water shown in Table 4 was taken and adjusted to pH of 11 with NaOH in a regulating tank, then fed into a reaction tank; the chlorine alkali industry waste water as shown in Table 5 was added to the reaction tank (the addition amount was 18 kg per ton of reverse osmosis concentrated water), and a PAC and PAM solution was added until the appearance of large floccule, mixed and reacted for 2 h. After the reaction, the precipitation was filtered by a plate and frame filter press, and the most of solid waste was $CaCO_3$ and $Mg(OH)_2$, which can be used as a raw material for building materials. The clear liquid obtained after filtration was fed into a clarification tank to adjust its pH to 6 with HCl and stayed herein for 1 h. After the above sodium hypochlorite oxidation and the process of reducing hardness and silicon, the COD of the reverse osmosis concentrated water was reduced to 123 ppm, and then the reverse osmosis concentrated water was filtered by the multi-media filter; the filtrate was fed into an oxidation tower loaded with 4# catalyst and stayed for 30 min. After the above catalytic oxidation reaction, the COD thereof was reduced to 34 ppm, the removal rate of COD was 78.5%, the pH was 6.5, the $SiO_2$ content of 5 ppm, and the hardness (calculated by $CaCO_3$) of 260 ppm.

Step (2): The effluent water of the oxidation tower was subjected to a secondary filtration by a security filter, and the obtained filtrate was fed into a roll reverse osmosis membrane module for reverse osmosis treatment; the water recovery rate was 80 wt %, and second-stage reverse osmosis product water and second-stage reverse osmosis concentrated water were obtained.

Step (3): The obtained second-stage reverse osmosis product water (COD was 2 ppm, ammonia nitrogen was 0.3 ppm, TDS was 80 ppm, and conductivity was 172 μs/cm) was reused as recycling water. The obtained second-stage reverse osmosis concentrated water (COD was 147 ppm, pH was 7, $SiO_2$ content was 25 ppm, hardness (calculated by $CaCO_3$) was 1640 ppm) was fed into an oxidation unit for continued processing. Specifically, 10 wt % of NaClO solution was added to the obtained second-stage reverse osmosis concentrated water (the addition amount was 3.4 Kg per ton of the second-stage reverse osmosis concentrated water), the mixed liquid was reacted in the oxidation device for 1 h and then fed into a regulating tank to adjust its pH to 6-9 with HCl; and $Na_2SO_3$ was added (the addition amount was 0.40 kg/t of the second-stage reverse osmosis concentrated water) for the reduction of excess NaClO, and stayed for 1 h; then the the second-stage reverse osmosis concentrated water was fed into a multi-media filter for filtration, and the filtrate was fed into an activated carbon adsorption tower for adsorption treatment of 2 h to obtain effluent water. The effluent water had a COD of 23 ppm and a COD removal rate of 84.4%, which meets the national standard GB 31571-2015 as shown in Table 2.

Example 9: Treatment of Reverse Osmosis Concentrated Water (2# Catalyst+NaClO, $Na_2Co_3$ and NaOH)

Step (1): The reverse osmosis concentrated water shown in Table 4 was taken and adjusted to pH of 11 with NaOH in a regulating tank, then fed into a reaction tank; 10 wt % of NaClO solution (the addition amount was 0.6 kg per ton of the reverse osmosis concentrated water), 30 wt % of $Na_2CO_3$ solution (the addition amount was 0.87 kg per ton of reverse osmosis concentrated water) and 48 wt % of NaOH solution (the addition amount was 0.06 kg per ton of reverse osmosis concentrated water) were further added to the reaction tank, and a PAC and PAM solution was added until the appearance of large floccule, mixed and reacted for 1 h. After the reaction, the precipitation was filtered by a plate and frame filter press, and the most of solid waste was $CaCO_3$ and $Mg(OH)_2$, which can be used as a raw material for building materials. The clear liquid obtained after filtration was fed into a clarification tank to adjust its pH to 7.5 with HCl and stayed herein for 1 h. After the above sodium hypochlorite oxidation and the process of reducing hardness and silicon, the clear liquid was then filtered by a multi-media filter, and the filtrate was fed into an oxidation tower loaded with 2# catalyst and stayed for 30 min. After the above catalytic oxidation reaction, the COD thereof was reduced to 20 ppm, the removal rate of COD was 60%, the pH was 7.8, the $SiO_2$ content was 10 ppm, and the hardness (calculated by $CaCO_3$) was 62 ppm.

Step (2): The effluent water of the oxidation tower was subjected to a secondary filtration by a security filter, and the obtained filtrate was fed into a roll reverse osmosis membrane module for reverse osmosis treatment; the water recovery rate was 85 wt %, and second-stage reverse osmosis product water and second-stage reverse osmosis concentrated water were obtained.

Step (3): The obtained second-stage reverse osmosis product water (COD was 3 ppm, ammonia nitrogen was 0.1 ppm, TDS was 41 ppm, and conductivity was 74 μs/cm) was reused as recycling water. The obtained second-stage reverse osmosis concentrated water (COD was 125 ppm, pH was 8.2, $SiO_2$ content was 50 ppm, hardness (calculated by $CaCO_3$) was 389 ppm) was fed into an oxidation unit for continued processing. Specifically, 10 wt % of NaClO solution was added to the obtained second-stage reverse osmosis concentrated water (the addition amount was 2.9 Kg per ton of the second-stage reverse osmosis concentrated water), and the mixed liquid was reacted in the oxidation device for 1 h and then was fed into a regulating tank to adjust its pH to 8 with HCl; and $Na_2SO_3$ was added (the addition amount was 0.34 kg/t of the second-stage reverse osmosis concentrated water) for the reduction of excess NaClO, then the second-stage reverse osmosis concentrated water was fed into a multi-media filter for filtration, and then the filtrate was fed into an activated carbon adsorption tower for adsorption treatment of 2 h to obtain effluent water. The effluent water had a COD of 15 ppm and a COD removal rate of 88.0%, which meets the national standard GB 31571-2015 as shown in Table 2.

Example 10: Treatment of Reverse Osmosis Concentrated Water (4# Catalyst+NaClO, $Na_2Co_3$ and NaOH)

Step (1): The reverse osmosis concentrated water shown in Table 4 was taken and adjusted to pH of 11 with NaOH in a regulating tank, then fed into the reaction tank; 10 wt % of NaClO solution (the addition amount was 3.6 kg per ton of the reverse osmosis concentrated water), 30 wt % of $Na_2CO_3$ solution (the addition amount was 5.4 kg per ton of the reverse osmosis concentrated water) and 48 wt % of NaOH solution (the addition amount was 0.375 kg per ton of the reverse osmosis concentrated water) were further added into the reaction tank, and a PAC and PAM solution was added until the occurance of large floccule, mixed and reacted for 2 h. After the reaction, the precipitation was filtered by a plate and frame filter press, and the most of solid waste was $CaCO_3$ and $Mg(OH)_2$, which can be used as a raw material for building materials. The clear liquid obtained after filtration was fed into a clarification tank to adjust its pH to 6 with HCl and stayed herein for 1 h. After the above sodium hypochlorite oxidation and the process of reducing hardness and silicon, the COD of the reverse osmosis concentrated water was reduced to 123 ppm, and the reverse osmosis concentrated water was filtered by a multi-media filter, and then the filtrate was fed into an oxidation tower loaded with 4# catalyst and stayed for 30 min. After the above catalytic oxidation reaction, the COD thereof was reduced to 34 ppm, the removal rate of COD was 78.5%, the pH was 6.5, the $SiO_2$ content was 5 ppm, and the hardness (calculated by $CaCO_3$) was 260 ppm.

Step (2): The effluent water of the oxidation tower was subjected to a secondary filtration by a security filter, and the obtained filtrate was fed into a roll reverse osmosis membrane module for reverse osmosis treatment; the water recovery rate was 80 wt %, and second-stage reverse osmosis product water and second-stage reverse osmosis concentrated water were obtained.

Step (3): The obtained second-stage reverse osmosis product water (COD was 2 ppm, ammonia nitrogen was 0.3 ppm, TDS was 81 ppm, and conductivity was 174 μs/cm) was reused as recycling water. The obtained second-stage reverse osmosis concentrated water (COD was 147 ppm, pH was 7, $SiO_2$ content was 25 ppm, hardness (calculated by $CaCO_3$) was 1640 ppm) was fed into an oxidation unit for continued processing. Specifically, 10 wt % of NaClO solution was added to the obtained second-stage reverse osmosis concentrated water (the addition amount was 3.4 Kg per ton of the second-stage reverse osmosis concentrated water), and the mixed liquid was reacted in the oxidation device for 1 h and then fed into a regulating tank to adjust its pH to 6-9 with HCl; and $Na_2SO_3$ was added (the addition amount was 0.40 kg/t of the second-stage reverse osmosis concentrated water) for the reduction of excess NaClO, and stayed for 1 h, then the second-stage reverse osmosis concentrated water was fed into a multi-media filter for filtration, and then the filtrate was fed into an activated carbon adsorption tower for adsorption treatment of 2 h to obtain effluent water. The effluent water had a COD of 23 ppm and a COD removal rate of 84.4%, which meets the national standard GB 31571-2015 as shown in Table 2.

Example 11: Treatment of Reverse Osmosis Concentrated Water (a Catalyst in CN 104549316 A+Chlorine Alkali Industry Waste Water)

Step (1): The reverse osmosis concentrated water shown in Table 4 was taken and adjusted to pH of 11 with NaOH in a regulating tank, then fed into a reaction tank; the chlorine alkali industry waste water as shown in Table 5 (the addition amount was 28 kg per ton of the reverse osmosis concentrated water) was added to the reaction, and a PAC and PAM solution was added until the appearance of large floccule, mixed and reacted for 1 h. After the reaction, the precipitation was filtered by a plate and frame filter press, and the most of solid waste was $CaCO_3$ and $Mg(OH)_2$, which can be used as a raw material for building materials. The clear liquid obtained after filtration was fed into a clarification tank to adjust the pH to 8 with HCl and stayed herein for 1 h. After the above sodium hypochlorite oxidation and the process of reducing hardness and silicon, the COD of the reverse osmosis concentrated water was reduced to 240 ppm, and the reverse osmosis concentrated water was filtered by a multi-media filter, then the filtrate was fed into an oxidation tower loaded with the catalyst of Example 1 in CN 104549316 A and stayed for 90 min. After the above catalytic oxidation reaction, the COD thereof was reduced to 112 ppm, the removal rate of COD was 62.7%, and then the water was fed into an activated the active carbon adsorption tower for adsorption treatment, after 2 h of adsorption treatment, the COD of the effluent water is 48 ppm, the pH was 8, the $SiO_2$ content was 10 ppm, and the hardness (calculated by $CaCO_3$) was 290 ppm.

Step (2): The effluent water of the activated carbon adsorption tower was subjected to a secondary filtration by a security filter, and the obtained filtrate was fed into a roll reverse osmosis membrane module for reverse osmosis treatment; the water recovery rate was 75 wt %, and second-stage reverse osmosis product water and second-stage reverse osmosis concentrated water were obtained.

Step (3): The obtained second-stage reverse osmosis product water (COD was 5 ppm, ammonia nitrogen was 0.4 ppm, TDS was 100 ppm, and conductivity was 190 μs/cm) was reused as recycling water. The obtained second-stage reverse osmosis concentrated water (COD was 205 ppm, pH was 8.5, $SiO_2$ content was 49 ppm, hardness (calculated by $CaCO_3$) was 1188 ppm) was fed into an oxidation unit for continued processing. Specifically, 10 wt % of NaClO solution was added to the obtained second-stage reverse osmosis concentrated water (the addition amount was 4.8 Kg per ton of the second-stage reverse osmosis concentrated water), and the mixed liquid was reacted in the oxidation device for 1 h and then fed into a regulating tank to adjust its pH to 7.5 with HCl; and $Na_2SO_3$ was added (the addition amount was 0.57 kg/t of the second-stage reverse osmosis concentrated water) for the reduction of excess NaClO, and stayed for 2 h, then the second-stage reverse osmosis concentrated water was fed into a multi-media filter for filtration, and then the filtrate was fed into an activated carbon adsorption tower for adsorption treatment of 2 h to obtain effluent water. The effluent water had a COD of 55 ppm, and a COD removal rate of 73.2%, which meets the national standard GB 31571-2015 as shown in Table 2. When the adsorption treatment time of the activated carbon adsorption tower was extended to 3 h, the COD of the obtained effluent water was 49 ppm, and the COD removal rate was 76.1%, which meets national standard GB 31571-2015 as shown in Table 2.

Comparative Example 1: Treatment of Reverse Osmosis Concentrated Water (Fenton Oxidation Process)

The reverse osmosis concentrated water shown in Table 4 was taken and treated by Fenton oxidation process, firstly the reaction pH was adjusted to 3, and 10 wt % of $H_2O_2$ solution (the addition amount was 6.4 kg per ton of the reverse osmosis concentrated water) and $FeSO_4$ (the addition amount was 0.57 kg per ton of the reverse osmosis concentrated water) were added thereinto. After reaction for 1 h, the pH was adjusted to 9, and a certain amount of PAC and PAM was added for flocculation and precipitation, then the reverse osmosis concentrated water was filtered by a multi-media filter, and the effluent water had a COD of 172 ppm and a COD removal rate of 42.7%; when the reaction temperature was increased to 50° C., and the reaction time was extended to 4 h, the effluent water had a COD of 148 ppm and a COD removal rate of 50.7%, which was difficult to reach the reverse osmosis water inflow index and the national standard GB 31571-2015 shown in Table 2, thus the subsequent reverse osmosis treatment was failed to be conducted.

Comparative Example 2: Treatment of Reverse Osmosis Concentrated Water (Catalyst of CN 101844828 B+NaClO, $Na_2Co_3$ and NaO)

Step (1): The reverse osmosis concentrated water shown in Table 4 was taken and adjusted to pH of 11 with NaOH in a regulating tank, then fed to a reaction tank; 10 wt % of NaClO solution (the addition amount was 0.58 kg per ton of the reverse osmosis concentrated water), 30 wt % of $Na_2CO_3$ solution (the addition amount was 0.87 kg per ton of the reverse osmosis concentrated water) and 48 wt % of NaOH solution (the addition amount was 0.06 kg per ton of the reverse osmosis concentrated water) were added to the reaction tank, and a PAC and PAM solution was added until the appearance of large floccule, mixed and reacted for 1 h. After the reaction, the precipitation was filtered by a plate and frame filter press, and the most of solid waste was $CaCO_3$ and $Mg(OH)_2$, which can be used as a raw material for building materials. The clear liquid was fed into a clarification tank to adjust its pH to 7.5 with HCl and stayed herein for 1 h. After the above sodium hypochlorite oxidation and the process of reducing hardness and silicon, the liquid was then filtered by a multi-media filter, and the filtrate was fed into an oxidation tower loaded with the catalyst of Example 1 in CN 101844828 B and stayed for 30 min. After the above catalytic oxidation reaction, the COD thereof was reduced to 29 ppm, the removal rate of COD was 42%, the pH was 7.8, the $SiO_2$ content was 10 ppm, and hardness (calculated by $CaCO_3$) was 62 ppm.

Step (2): The effluent water of the oxidation tower was subjected to a secondary filtration by a security filter, and the obtained filtrate was fed into a roll reverse osmosis membrane module for reverse osmosis treatment; the water recovery rate was 85 wt %, and second-stage reverse osmosis product water and second-stage reverse osmosis concentrated water were obtained.

Step (3): The obtained second-stage reverse osmosis product water (COD was 3 ppm) was reused as recycling water, and the obtained second-stage reverse osmosis concentrated water (COD was 188 ppm) was treated by Fenton oxidation process. Specifically, 10 wt % of $H_2O_2$ solution (the addition amount was 4.0 kg per ton of the second-stage reverse osmosis concentrated water) and $FeSO_4$ (the addition amount was 0.36 kg per ton of the second-stage reverse osmosis concentrated water) were added to the second-stage reverse osmosis concentrated water. After reaction for 1 h, the pH was adjusted to 9 and PAC and PAM were added for flocculation and precipitation. After filtration by a multi-media filter, the COD of effluent water was 128 ppm, and the COD removal rate was 32.0%; when the reaction temperature was increased to 50° C., and the reaction time was extended to 4 h, the effluent water had a COD of 101 ppm and a COD removal rate of 46.3%, which was difficult to meet the national standard GB 31571-2015 as shown in Table 2.

Comparative Example 3: Treatment of Reverse Osmosis Concentrated Water (Catalyst of CN 104549316 A+Chlorine Alkali Industry Waste Water)

Step (1): The reverse osmosis concentrated water shown in Table 4 was taken and adjusted to pH of 11 with NaOH in a regulating tank, then fed to a reaction tank; the chlorine alkali industry waste water as shown in Table 5 (the addition amount was 18 kg per ton of reverse osmosis concentrated water) was added to the reaction tank, and a PAC and PAM solution was added until the appearance of large floccule, mixed and reacted for 2 h. After the reaction, the precipitation was filtered by a plate and frame filter press, and the most of solid waste was $CaCO_3$ and $Mg(OH)_2$, which can be used as a raw material for building materials. The clear liquid obtained after filtration was fed into a clarification tank to adjust its pH to 6 with HCl and stayed herein for 1 h. After the above sodium hypochlorite oxidation and the process of reducing hardness and silicon, the COD of the reverse osmosis concentrated water was reduced to 123 ppm, and the reverse osmosis concentrated water was then filtered by a multi-media filter, and the filtrate was fed into an oxidation tower loaded with the catalyst of Example 1 in CN 104549316 A and stayed for 30 min. After the above catalytic oxidation reaction, the COD thereof was reduced to 49 ppm, the removal rate of COD was 68.9%, the pH was 6.5, the $SiO_2$ content was 5 ppm, and the hardness (calculated by $CaCO_3$) was 260 ppm.

Step (2): The effluent water of the oxidation tower was subjected to a secondary filtration by a security filter, and the obtained filtrate was fed into a roll reverse osmosis membrane module for reverse osmosis treatment; the water recovery rate was 80 wt %, and second-stage reverse osmosis product water and second-stage reverse osmosis concentrated water were obtained.

Step (3): The obtained second-stage reverse osmosis product water (COD was 3 ppm, ammonia nitrogen was 0.2 ppm, TDS was 80 ppm, conductivity was 170 μs/cm) was reused as recycling water, and the obtained second-stage reverse osmosis concentrated water (COD was 247 ppm) was treated by Fenton oxidation process. Specifically, 10 wt % of $H_2O_2$ solution (the addition amount was 5.2 kg per ton of the second-stage reverse osmosis concentrated water) and $FeSO_4$ (the addition amount was 0.47 kg per ton of the second-stage reverse osmosis concentrated water) were added to the second-stage reverse osmosis concentrated water. After reaction for 1 h, the pH was adjusted to 9 and PAC and PAM were added for flocculation and precipitation. After filtration by a multi-media filter, the COD of the effluent water was 153 ppm, and the COD removal rate was 38.0%; when the reaction temperature was increased to 50° C., and the reaction time was extended to 4 h, the effluent water had a COD of 127 ppm and a COD removal rate of 48.6%, which was difficult to meet the national standard GB 31571-2015 as shown in Table 2.

Comparing Examples 5-11 with Comparative Examples 1-3, it can be known that:

1. Through the treating method of the reverse osmosis concentrated water of the present invention, such as the treatments of steps (1), (2) and (3), the organics and hardness ions in the reverse osmosis concentrated water can be removed by using a precipitant and an oxidant; and by combining with the subsequent reverse osmosis treatment, not only 75-85 wt % of the water (second-stage reverse osmosis product water) can be recovered, but also the overall utilization rate of water is improved. Meanwhile, the subsequent reverse osmosis treatment allows the remaining water accounting for a small amount of the water (second-stage reverse osmosis product water) to meet the requirements of GB 31571-2015 in Table 2 and then is discharged as effluent water. Compared with the treatment methods of the comparative examples, the method of the present application is environment friendly, has low economic input, simple and easy to operate;

2. Comparing using the chlorine alkali industry waste water containing NaClO, NaOH and $Na_2CO_3$ to perform the oxidation and precipitation treatment on the reverse osmosis concentrated water with using NaClO, NaOH and $Na_2CO_3$ directly to perform the oxidation and precipitation treatment on the reverse osmosis concentrated water, there is no difference between the treatment results, which indicates that: this application can fully utilize the oxidizability of a small amount of sodium hypochlorite containing in the chlorine alkali industry waste water to achieve the treatment of refractory organic pollutants in the reverse osmosis concentrated water, make full use of the precipitation reaction of NaOH and $Na_2CO_3$ contained in the chlorine alkali industry waste water, achieve the removal of $Ca^{2+}$, $Mg^{2+}$, $SiO_2$ and the like in the reverse osmosis concentrated water, and achieve the purpose of treating waste by waste. In the actual industrial process, the reverse osmosis concentrated water can be treated with the chlorine alkali industry waste water containing oxidant and precipitant, which saves the cost of chemicals, and also saves the expense of agents and cost of treating chlorine alkali industry waste water compared with directly using an oxidant and a precipitant;

3. Compared with the catalyst in the prior art, the catalyst of the present invention has a higher catalytic oxidation performance, thereby effectively degrades the refractory organic pollutants in the reverse osmosis concentrated water; the treatment effect on the reverse osmosis concentrated water is good, and the COD removal rate is high.

For the catalysts having the same components and contents thereof, compared with a pure spherical aluminum oxide carrier, the treatment effect on the reverse osmosis concentrated water is better and the COD removal rate is higher when the carrier was a cerium modified aluminum oxide carrier.

Specifically, comparing Examples 5 and 11 to Comparative Example 1, it can be seen that:

Compared with the prior art of Comparative Example 1, the method of the present invention has a better treatment effect on reverse osmosis concentrated water and a higher COD removal rate.

The catalytic oxidation of the oxidant with the catalyst of the invention and the catalyst of the prior art can both achieve the object of the present invention, and the treatment effect on the reverse osmosis concentrated water was good and the COD removal rate was high.

However, compared with using a catalyst in the prior art, using the catalyst of the present invention can improve the treatment effect on the reverse osmosis concentrated water and increase the COD removal rate.

Comparing Examples 5 and 9 with Comparative Example 2, it can be seen that:

In step (1), comparing using the chlorine alkali industry waste water containing NaClO, NaOH and $Na_2CO_3$ to perform the oxidation and precipitation treatment on the reverse osmosis concentrated water with using NaClO, NaOH and $Na_2CO_3$ directly to perform the oxidation and precipitation treatment on the reverse osmosis concentrated water, there is no difference between the treatment results. However, it can achieve the purpose of treating waste by waste through treatment to organic waste water such as reverse osmosis concentrated water and the like with the chlorine alkali industry waste water containing NaClO, NaOH and $Na_2CO_3$.

In step (3), compared with Fenton oxidation treatment used in Comparative Example 2, the method of the present invention uses the oxidant such as NaClO, the reductant such as $Na_2SO_3$, and the activated carbon adsorption and the like for treatment, and the treatment effect on the second-stage reverse osmosis concentrated water is better and the COD removal rate is higher.

Comparing Example 8 with Example 10, it can be seen that:

In step (1), comparing using the chlorine alkali industry waste water containing NaClO, NaOH and $Na_2CO_3$ to perform the oxidation and precipitation treatment on the reverse osmosis concentrated water with using NaClO, NaOH and $Na_2CO_3$ directly to perform the oxidation and precipitation treatment on the reverse osmosis concentrated water, there is no difference between the treatment results. However, it can achieve the purpose of treating waste by waste through treatment to organic waste water such as reverse osmosis concentrated water and the like with the chlorine alkali industry waste water containing NaClO, NaOH and $Na_2CO_3$.

Comparing Example 8 with Comparative Example 3, it can be seen that:

In step (3), compared with Fenton oxidation treatment used in Comparative Example 3, the method of the present invention uses the oxidant such as NaClO, the reductant such as $Na_2SO_3$, and the activated carbon adsorption and the like for treatment, and the treatment effect on the second-stage reverse osmosis concentrated water is better and the COD removal rate is higher.

The invention claimed is:

1. A treating method of reverse osmosis concentrated water, characterized in that, comprising the following steps:
    (1) adding a precipitant and an oxidant to reverse osmosis concentrated water for treatment, filtering to obtain a filtered liquid, and adding a catalyst for water treatment to the filtered liquid for catalytic oxidation to obtain first-stage treated water; wherein the obtaining of the first-stage treated water further comprises subjecting the liquid after catalytic oxidation to an adsorption treatment;
    (2) performing reverse osmosis treatment on the first-stage treated water obtained in step (1), to obtain second-stage reverse osmosis product water and second-stage reverse osmosis concentrated water, wherein the second-stage reverse osmosis product water is recycled;
    (3) adding an oxidant to the second-stage reverse osmosis concentrated water obtained in step (2) for oxidation treatment to obtain effluent water which is used to for directly discharging; wherein the obtaining of the effluent water further comprises subjecting the liquid after oxidation treatment to an adsorption treatment.

2. The treating method according to claim 1, characterized in that, the COD of the reverse osmosis concentrated water is less than or equal to 300 ppm; the $Ca^{2+}$ content of the reverse osmosis concentrated water is 0-1000 ppm; the $Mg^{2+}$ content is 0-500 ppm.

3. The treating method according to claim 1, characterized in that, in step (1), the precipitant is selected from the group consisting of NaOH, KOH, $Na_2CO_3$, $NaHCO_3$, and any combination thereof.

4. The treating method according to claim 1, characterized in that, in step (1), the oxidant is selected from the group consisting of a compound containing available chlorine, $H_2O_2$, and any combination thereof, the compound containing available chlorine is selected from the group consisting of NaClO, $NaClO_3$, $Cl_2$, $ClO_2$, and any combination thereof.

5. The treating method according to claim 1, characterized in that, in step (1), the oxidant is NaClO, the precipitant is $Na_2CO_3$ and NaOH, and the precipitant and oxidant are derived from a waste water containing NaClO, $Na_2CO_3$ and NaOH; wherein the waste water has available chlorine content that is 2-4 wt %, the $Na_2CO_3$ content is 5-10 wt %, and the NaOH content is 0.1-2 wt %.

6. The treating method according to claim 5, characterized in that, in step (1), the dosage of the chlorine alkali industry waste water is 2-50 kg per ton of the reverse osmosis concentrated water.

7. The treating method according to claim 1, characterized in that, in step (1), the reaction time of the catalytic oxidation is 0.5-2 h.

8. The treating method according to claim 1, characterized in that, in step (1), the catalyst comprises aluminium oxide and nickel, iron, manganese and cerium loaded on the aluminium oxide in the form of oxide; based on the weight of the aluminium oxide, the contents of the following components in the catalyst are:
nickel 5.0-20 wt %;
iron 0.5-5.5 wt %;
manganese 0.5-3.5 wt %;
cerium 1.5-3.0 wt %.

9. The treating method according to claim 8, characterized in that, the catalyst comprises cerium modified aluminium oxide carrier and nickel, iron, manganese and cerium loaded on the cerium modified aluminium oxide carrier in the form of oxide; the cerium modified aluminium oxide carrier comprises aluminium oxide and cerium loaded on the aluminium oxide in the form of oxide; based on the weight of the aluminium oxide, the cerium content of the cerium modified aluminium oxide carrier is 1.0-2.0 wt %.

10. The treating method according to claim 9, characterized in that, based on the weight of the aluminium oxide, the cerium loaded on the cerium modified aluminium oxide carrier in the catalyst has a content of 0.5-2.0 wt %.

11. The treating method according to claim 1, characterized in that, in step (1), before adding the precipitant and oxidant to the reverse osmosis concentrated water, adjusting the pH of the reverse osmosis concentrated water to 6-12.

12. The treating method according to claim 11, characterized in that, in step (1), adjusting the pH of the reverse osmosis concentrated water with a pH regulator, wherein the pH regulator is an alkaline pH regulator, and the alkaline pH regulator is selected from a group consisting of NaOH, KOH, $Ca(OH)_2$, $Mg(OH)_2$, ammonia water, and any combination thereof.

13. The treating method according to claim 11, characterized in that, in step (1), before adding the catalyst to the filtered liquid, adjusting the pH of the filtered liquid to 6-9.

14. The treating method according to claim 13, characterized in that, the method comprising the following steps:
(1) firstly adjusting the pH of the reverse osmosis concentrated water to 9.5-11.5, then adding the precipitant and oxidant for treatment thereinto, filtering to obtain the filtered liquid, adjusting pH of the filtered liquid to be 7-8, wherein the filtering is with a multi-media filter, adding the catalyst to the obtained filtrate for catalytic oxidation, to obtain a reaction liquid, and then subjecting the reaction liquid to an adsorption treatment in an adsorption apparatus to obtain first-stage treated water; wherein the catalyst in step (1) comprises cerium modified aluminium oxide carrier and nickel, iron, manganese and cerium loaded on the cerium modified aluminium oxide carrier in the form of oxide; the cerium modified aluminium oxide carrier comprises aluminium oxide and cerium loaded on the aluminium oxide in the form of oxide; based on the weight of the aluminium oxide, the contents of the following components in the catalyst are:
nickel 5.5-12.0 wt %;
iron 1.5-5.0 wt %;
manganese 1.0-3.0 wt %;
cerium 2.0-2.8 wt %;
and based on the weight of the aluminium oxide, the cerium content of the cerium modified aluminium oxide carrier is 1.2-1.5 wt %,
(2) performing reverse osmosis treatment on the first-stage treated water obtained in step (1) to obtain second-stage reverse osmosis product water and second-stage reverse osmosis concentrated water, wherein the second-stage reverse osmosis product water is recycled;
(3) wherein the oxidant is sodium hypochlorite, and adding sodium hypochlorite to the second-stage reverse osmosis concentrated water obtained in step (2) for oxidation treatment to obtain an oxidation reaction liquid, adjusting the pH of the oxidation reaction liquid to 6-9, then adding a reductant thereinto to remove excess sodium hypochlorite, and then subjecting the obtained liquid to an adsorption treatment in an adsorption apparatus, to obtain effluent water, wherein the effluent water is used for directly discharging.

15. The treating method according to claim 2, characterized in that, the catalyst comprises cerium modified aluminium oxide carrier and nickel, iron, manganese and cerium loaded on the cerium modified aluminium oxide carrier in the form of oxide; the cerium modified aluminium oxide carrier comprises aluminium oxide and cerium loaded on the aluminium oxide in the form of oxide; based on the weight of the aluminium oxide, the cerium content of the cerium modified aluminium oxide carrier is 1.0-2.0 wt %; based on the weight of the aluminium oxide, the contents of the following components in the catalyst are:
nickel 5.0-20 wt %;
iron 0.5-5.5 wt %;
manganese 0.5-3.5 wt %;
cerium 1.5-3.0 wt %.

16. The treating method according to claim 1, characterized in that, the COD of the reverse osmosis concentrated water is 50-250 ppm; the $Ca^{2+}$ content of the reverse osmosis concentrated water is 50-500 ppm; the $Mg^{2+}$ content is 50-200 ppm; the $SiO_2$ content is 10-150 ppm;
and in step (1), the precipitant is $Na_2CO_3$, $NaHCO_3$, or any combination thereof, and the oxidant is NaClO, $H_2O_2$, or any combination thereof.

17. The treating method according to claim 5, characterized in that, in step (1), the dosage of the chlorine alkali industry waste water is 2-40 kg per ton of the reverse osmosis concentrated water, and the reaction time of the catalytic oxidation is 0.5-1.5 h.

18. The treating method according to claim 8, characterized in that, based on the weight of the aluminium oxide, the contents of the following components in the catalyst are:
  nickel 5.5-12.0 wt %;
  iron 1.5-5.0 wt %;
  manganese 1.0-3.0 wt %;
  cerium 2.0-2.8 wt %.

19. The treating method according to claim 9, characterized in that, based on the weight of the aluminium oxide, the cerium content of the cerium modified aluminium oxide carrier is 1.2-1.5 wt %; and based on the weight of the aluminium oxide, the cerium loaded on the cerium modified aluminium oxide carrier in the catalyst has a content of 0.6-1.5 wt %.

20. The treating method according to claim 11, characterized in that, in step (1), before adding the precipitant and oxidant to the reverse osmosis concentrated water, adjusting the pH of the reverse osmosis concentrated water to 9-11;
  and in step (1), adjusting the pH of the reverse osmosis concentrated water with a pH regulator, wherein the pH regulator is an alkaline pH regulator, and the alkaline pH regulator is NaOH, KOH, or any combination thereof;
  and in step (1), before adding the catalyst to the filtered liquid, adjusting the pH of the filtered liquid to 7-8.

* * * * *